United States Patent
Chiou et al.

(10) Patent No.: US 12,555,360 B2
(45) Date of Patent: Feb. 17, 2026

(54) IMAGE RECOGNITION METHOD AND ELECTRONIC APPARATUS THEREOF

(71) Applicants: Industrial Technology Research Institute, Hsinchu (TW); Taichung Veterans General Hospital, Taichung (TW)

(72) Inventors: Yu-An Chiou, Hsinchu (TW); Yueh-Se Li, Yilan County (TW); Shih-Fang Yang Mao, Hsinchu County (TW); Wen-Cheng Chao, Changhua County (TW); Sou-Jen Shih, Taichung (TW); Shu-Fang Liu, Taichung (TW); Hui-Jiun Chen, Taichung (TW); Chieh-Liang Wu, Taichung (TW)

(73) Assignees: Industrial Technology Research Institute, Hsinchu (TW); Taichung Veterans General Hospital, Taichung (TW)

( * ) Notice: Subject to any disclaimer, the term of this patent is extended or adjusted under 35 U.S.C. 154(b) by 436 days.

(21) Appl. No.: 18/079,875

(22) Filed: Dec. 13, 2022

(65) Prior Publication Data

US 2023/0196737 A1 Jun. 22, 2023

Related U.S. Application Data

(60) Provisional application No. 63/291,904, filed on Dec. 20, 2021.

(30) Foreign Application Priority Data

Sep. 14, 2022 (TW) .................................. 111134783

(51) Int. Cl.
*G06V 10/774* (2022.01)
*G06V 10/26* (2022.01)
(Continued)

(52) U.S. Cl.
CPC ............ *G06V 10/774* (2022.01); *G06V 10/26* (2022.01); *G06V 10/776* (2022.01); *G06V 10/806* (2022.01); *G06V 10/82* (2022.01)

(58) Field of Classification Search
CPC .... G06V 10/774; G06V 10/26; G06V 10/776; G06V 10/806; G06V 10/82; G06V 40/174
See application file for complete search history.

(56) References Cited

U.S. PATENT DOCUMENTS

| | | |
|---|---|---|
| 6,879,709 B2 | 4/2005 | Tian et al. |
| 9,036,018 B2 | 5/2015 | Wang et al. |
(Continued)

FOREIGN PATENT DOCUMENTS

| | | | | |
|---|---|---|---|---|
| CN | 109154861 | | 1/2019 | |
| CN | 113095370 A | * | 7/2021 | ......... G06F 18/2415 |
(Continued)

OTHER PUBLICATIONS

Zheng et al, Probability Fusion Decision Framework of Multiple Deep Neural Networks for Fine-Grained Visual Classification, 2019, IEEE Digital Object Identifier, 7(2019): 122740-122754. (Year: 2019).*

(Continued)

*Primary Examiner* — Kathleen M Broughton
(74) *Attorney, Agent, or Firm* — JCIPRNET

(57) ABSTRACT

An image recognition method and an electronic apparatus configured for image recognition are provided. A training sample set is provided to train a recognition model including neural networks to recognize a classification label to which an image to be tested belongs through the trained recognition model. The training sample set includes image sets respectively belonging to users. During the training process, training images corresponding to classification labels are obtained from a first image set in the training sample set as (Continued)

reference images for training; a training image is obtained from a second image set different from the first image set as an input image for training; the reference images for training and the input image for training are obtained as inputs to the neural networks for training. The input to each neural network includes at least one of the reference images for training and the input image for training.

14 Claims, 5 Drawing Sheets

(51) Int. Cl.
*G06V 10/776* (2022.01)
*G06V 10/80* (2022.01)
*G06V 10/82* (2022.01)

(56) References Cited

U.S. PATENT DOCUMENTS

| | | | |
|---|---|---|---|
| 9,258,482 | B2 | 2/2016 | Kaneda |
| 10,380,414 | B2 | 8/2019 | Yao et al. |
| 10,417,483 | B2 | 9/2019 | Alsmadi |
| 2017/0304732 | A1* | 10/2017 | Velic .............. G06V 10/774 |
| 2017/0330059 | A1* | 11/2017 | Novotny .......... G06V 10/7515 |
| 2019/0205626 | A1 | 7/2019 | Kim et al. |
| 2019/0347522 | A1* | 11/2019 | Nir ................. G06V 40/173 |
| 2020/0234068 | A1* | 7/2020 | Zhang ............. G06F 18/2413 |
| 2021/0182664 | A1 | 6/2021 | Kim et al. |
| 2021/0192193 | A1 | 6/2021 | Shaburov et al. |
| 2021/0248581 | A1 | 8/2021 | Garner et al. |
| 2021/0312214 | A1 | 10/2021 | Yang et al. |
| 2022/0092351 | A1* | 3/2022 | Huang ............... G06V 10/95 |
| 2022/0415029 | A1* | 12/2022 | Iventosch .......... G06V 10/26 |

FOREIGN PATENT DOCUMENTS

| | | |
|---|---|---|
| TW | I430185 | 3/2014 |
| TW | M486114 | 9/2014 |
| TW | 202044196 | 12/2020 |
| TW | 202109366 | 3/2021 |
| TW | 202113577 | 4/2021 |
| TW | I734449 | 7/2021 |
| TW | I743837 | 10/2021 |

OTHER PUBLICATIONS

Zhang et al, A Feature Fusion Method with Guided Training for Classification Tasks, 2021, Computational Intelligence and Neuroscience, 2021, pp. 1-11. (Year: 2021).*
An et al, Facial expression recognition algorithm based on parameter adaptive initialization of CNN and LSTM, 2020, Visual Computer 36: 483-498. (Year: 2020).*
"Notice of allowance of Taiwan Counterpart Application", issued on Feb. 24, 2023, p. 1-p. 3.
Karan Sikka et al., "Automated Assessment of Children's Postoperative Pain Using Computer Vision", Pediatrics, Jul. 2015, pp. 124-131.
Ahmed Ashraf et al., "Pain Expression Recognition Using Occluded Faces", 2019 14th IEEE International Conference on Automatic Face & Gesture Recognition, May 14-18, 2019, pp. 1-5.
Pau Rodriguez et al., "Deep Pain: Exploiting Long Short-Term Memory Networks for Facial Expression Classification", IEEE Transactions on Cybernetics, Feb. 9, 2017, pp. 3314-3324.
Miriam Kunz et al., "Facial muscle movements encoding pain—a systematic review", Pain, Mar. 2019, pp. 1-38.
Henrik Pedersen et al., "Learning Appearance Features for Pain Detection Using the UNBC-McMaster Shoulder Pain Expression Archive Database", International Conference on Computer Vision Systems, Jul. 2015, pp. 1-10.
Huang Yibo et al., "HybNet: a hybrid network structure for pain intensity estimation", The Visual Computer, Mar. 2022, pp. 1-6.
Naoya Kobayashi et al., "Semi-automated tracking of pain in critical care patients using artificial intelligence: a retrospective observational study", Scientific Reports, Mar. 2021, pp. 1-8.
Chieh-Liang Wu et al., "Deep Learning-Based Pain Classifier Based on the Facial Expression in Critically Ill Patients", Frontiers in Medicine, Mar. 17, 2022, pp. 1-8.

* cited by examiner

IMAGE RECOGNITION METHOD AND ELECTRONIC APPARATUS THEREOF

CROSS-REFERENCE TO RELATED APPLICATION

This application claims the priority benefit of U.S. provisional application Ser. No. 63/291,904, filed on Dec. 20, 2021 and Taiwan patent application serial no. 111134783, filed on Sep. 14, 2022. The entirety of each of the above-mentioned patent applications is hereby incorporated by reference herein and made a part of this specification.

TECHNICAL FIELD

The disclosure relates to an image recognition technology; more particularly, the disclosure relates to an image recognition method and an electronic apparatus thereof.

BACKGROUND

Computer vision is a machine vision that enables cameras and computers to mimic how human eyes recognize, track, and measure targets, and an image processing operation is further performed by the computers, so that the images become more suitable for human eyes to observe or for transmission to instruments for detection. The image processing operation refers to analyzing and processing images, so that machines (computers) are able to obtain more useful information from the processed images and subsequently detect, analyze, and apply these images in a more reliable manner.

The recognition of images through computer vision already includes human face recognition, intrusion detection, license plate recognition, behavior detection, and the like. According to different targets, different image recognition methods are applied to identify objects in the images. As the application becomes more and more extensive, how to further improve the accuracy of image recognition is one of the issues to be solved.

SUMMARY

The disclosure provides an image recognition method and an electronic apparatus thereof, which may improve the accuracy of image recognition.

In an embodiment of the disclosure, an image recognition method carried out by a processor is provided, and the image recognition method includes following steps. A recognition model is trained to recognize which one of a plurality of classification labels to which an image to be tested belongs through the trained recognition model, where the recognition model includes a plurality of neural networks. Steps of training the recognition model includes following steps. A training sample set is provided, where the training sample set includes a plurality of image sets respectively belonging to a plurality of users, each of the image sets includes a plurality of training images, and each of the training images is labeled by one of the classification labels. The training images respectively corresponding to the classification labels are obtained from a first image set as a plurality of reference images for training, where the first image set is one of the image sets. One of the training images is obtained from a second image set as an input image for training, where the second image set is another of the image sets different from the first image set. The reference images for training and the input image for training are taken as inputs to the neural networks, so as to perform the training, where the input to each of the neural networks includes at least one of the reference images for training and the input image for training.

In an embodiment of the disclosure, an electronic apparatus configured for image recognition includes a storage apparatus and a processor. The storage apparatus stores a training sample set, the training sample set includes a plurality of image sets respectively belonging to a plurality of users, each of the image sets includes a plurality of training images, and each of the training images is labeled by one of a plurality of classification labels. The processor is coupled to the storage apparatus and configured to train a recognition model to recognize which one of the classification labels to which an image to be tested belongs through the trained recognition model. The recognition model includes a plurality of neural networks. The processor is configured to train the recognition model, and steps of training the recognition model include the following. The training images respectively corresponding to the classification labels are obtained from a first image set as a plurality of reference images for training, where the first image set is one of the image sets. One of the training images is obtained from a second image set as an input image for training, where the second image set is another of the image sets different from the first image set. The reference images for training and the input image for training are taken as inputs to the neural networks, so as to perform the training, where the input to each of the neural networks includes at least one of the reference images for training and the input image for training.

In view of the above, according to one or more embodiments of the disclosure, during the training, the reference images for training and the input image for training from different users are taken as the inputs to the neural networks, so as to perform the training. Features may be extracted based on differences between the images, and therefore the accuracy of the recognition model may be improved.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
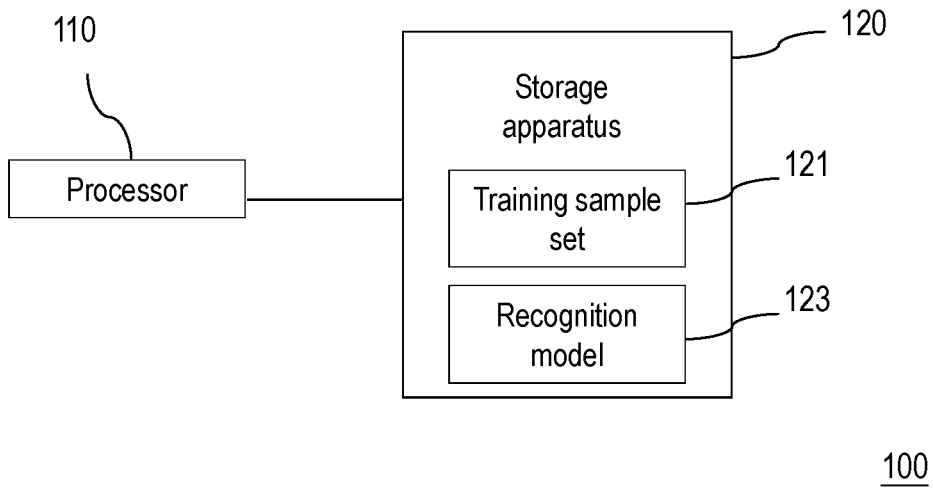
FIG. 1 is a block view of an electronic apparatus configured for image recognition according to an embodiment of the disclosure.

FIG. 1 is a block view of an electronic apparatus configured for image recognition according to an embodiment of the disclosure. With reference to FIG. 1, an electronic apparatus 100 includes a processor 110 and a storage apparatus 120. The processor 110 is coupled to the storage apparatus 120. The components of the electronic apparatus 100 are determined according to the requirements for achieving computer vision, and the electronic apparatus 100 may be further used together with an image capturing apparatus.

The processor 110 is, for instance, a central processing unit (CPU), a physics processing unit (PPU), a programmable microprocessor, an embedded control chip, a digital signal processor (DSP), an application specific integrated circuit (ASIC), or other similar apparatuses.

The storage apparatus 120 is, for instance, any type of fixed or movable random access memory (RAM), read-only memory (ROM), flash memory, hard disk, other similar apparatuses, or a combination thereof. The storage apparatus 120 includes one or a plurality of programming code snippets, a training sample set 121, and a recognition model 123. After the programming code snippets are installed, the processor 110 trains the recognition model 123, and then the trained recognition model 123 may be applied to recognize which one of a plurality of classification labels to which an image to be tested belongs.

The training sample set 121 includes a plurality of image sets that respectively belong to a plurality of users. Each of the image sets includes a plurality of training images, and each of the training images is labeled by one of the classification labels. As to facial expression recognition, the facial expressions may be classified into three types: calm, tense, and painful, and the corresponding classification labels may be set as 0, 1, and 2, which is merely exemplary and should not be construed as a limitation in the disclosure. In other embodiments, more kinds of facial expressions may be further defined to set more classification labels.

Figure 2:
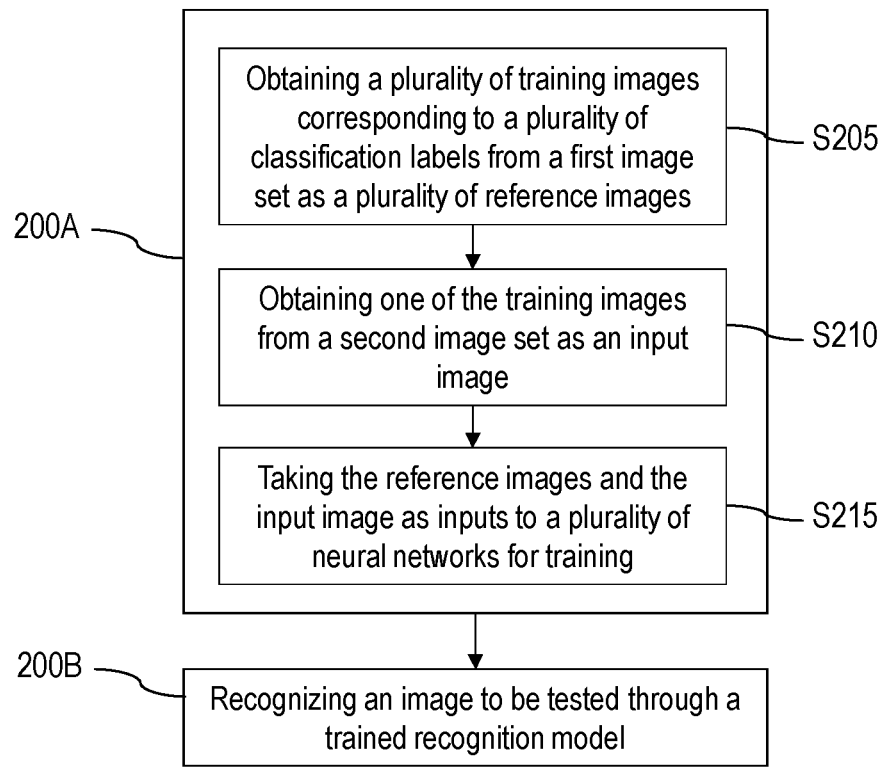
FIG. 2 is a flowchart of an image recognition method according to an embodiment of the disclosure.

FIG. 2 is a flowchart of an image recognition method according to an embodiment of the disclosure. With reference to FIG. 1 and FIG. 2, in step 200A (including steps S205-S215), the recognition model 123 is trained by the processor 110. The recognition model 123 includes a plurality of neural networks. After that, in step 200B, the processor 110 recognizes the image to be tested through the trained recognition model 123. For instance, the electronic apparatus 100 may be further used together with an image capturing apparatus, so as to capture the image to be tested by the image capturing apparatus. The image capturing apparatus may be built in the electronic apparatus 100 or coupled to the electronic apparatus 100 in a wireless manner or through a cable. In terms of actual applications, a current image may be obtained as the image to be tested by the image capturing apparatus and may be recognized immediately through the trained recognition model 123.

A training process of the recognition model 123 is described below by steps S205 to S215.

In step S205, a plurality of training images corresponding to a plurality of classification labels are obtained from a first image set as a plurality of reference images (reference images for training), where the first image set is one of the image sets. In step S210, one of the training images is obtained from a second image set as an input image (an input image for training), where the second image set is another of the image sets different from the first image set. That is, in each iteration training process, the processor 110 obtains a plurality of reference images from the training images belonging the same user and obtained an input image from the training images belonging another user.

Next, in step S215, the reference images and the input image are taken as inputs to a plurality of neural networks for training. Here, the input to each of the neural networks in the recognition model 123 includes at least one reference image and one input image. For instance, when the classification labels include the condition of being calm (labeled as "0"), tense (labeled as "1"), and painful (labeled as "2"), the input to each of the neural networks may include following conditions: one reference image labeled as "0," "1," or "2" and one input image, one reference image labeled as "0", another reference image labeled as "1" or "2", and one input image, and three reference images labeled as "0," "1," and "2" and one input image. In addition, an average image obtained by two training images labeled as "1" and "2" may also serve as one reference image.

In an embodiment, a first architecture of the recognition model 123 includes a first quantity of neural networks, and each neural network has a corresponding fusion layer and a corresponding fully connected layer. In the first architecture, a reference feature and an input feature are extracted from the reference images and the input image in the input to each of the neural networks, respectively; the reference feature and the input feature are combined through the fusion layer corresponding to each of the neural networks to obtain the combined feature; a predicted result is obtained from the combined feature through the fully connected layer corresponding to each of the neural networks; a final predicted result is obtained from all of the predicted results of the neural networks by applying a voting method with use of a voting model.

In another embodiment, a second architecture of the recognition model 123 includes a second quantity of neural networks, which are paired with a fusion layer and a timing neural network to obtain a final predicted result. In the second architecture, the reference feature and the input feature are extracted from the reference image and the input image in the input to each of the neural networks; all the reference features and all the input features obtained from the neural networks are combined through the fusion layer to obtain a combined feature; a final predicted result is obtained from the combined feature through the timing neural network.

The two architectures of the recognition model 123 are exemplified below.

Figure 3:
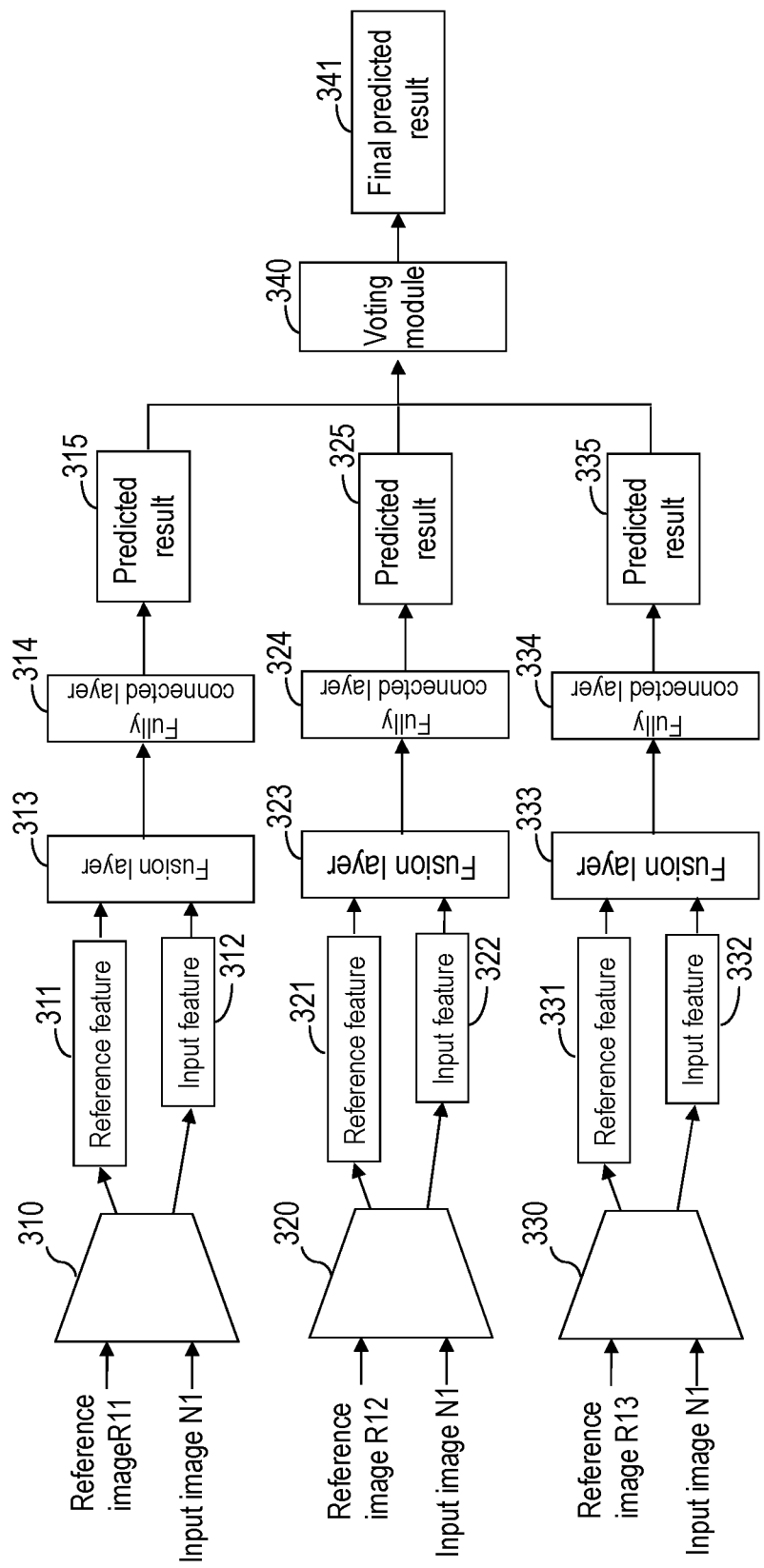
FIG. 3 is a schematic view of a first architecture of a recognition model according to an embodiment of the disclosure.

FIG. 3 is a schematic view of a first architecture of a recognition model according to an embodiment of the disclosure. In the first architecture as shown in FIG. 3, the first quantity is exemplified as three (neural networks 310-330); however, the quantity of the neural networks applied is not limited in this disclosure. Two, four, or more neural networks may be applied in other embodiments.

With reference to FIG. 3, the first architecture includes neural networks 310, 320, and 330, fusion layers 313, 323, and 333 and fully connected layers 314, 324, and 334 respectively corresponding to the neural networks 310, 320, and 330, and a voting module 340. In each iteration training process, the processor 110 randomly selects three training images (with the same or different classification labels) as reference images R11-R13 of the neural networks 310-330 from one of the image sets (the first image set) belonging to one of the users in the training sample set 121. In addition, the processor 110 randomly selects a training image as the input image N1 from another of the image sets (the second image set) belonging to another user in the training sample set 121.

That is, in each iteration training process, the processor 110 takes three training images belonging to one user (a user A1) as the reference images R11-R13 and individually inputs the same input image N1 belonging to another user (a user A2 different from the user A1) to the neural networks 310-330, so as to obtain predicted results 315-335. In each iteration training process, another three training images may be further obtained from the training images that have not been obtained as the reference images R11-R13. The training images that have been obtained and used are not taken again in the subsequent iteration training process.

In addition, the order of the classification labels of the training images to be obtained may be further determined. For instance, in each iteration training process, the training images with the classification labels "0," "1," and "2" are sequentially selected from the image set belonging to the user A1 as the reference images R11-R13, and the training images with the classification labels "0," "1," and "2" in the image set belonging to the user A2 are sequentially obtained as the input image N1.

As shown in Table 1, three iteration training processes (iteration training processes 1-3) are set as one cycle. In the iteration training process 1, the classification labels of the reference images R11-R13 and the input image N1 are all "0". In the iteration training process 2, the classification labels of the reference images R11-R13 and the input image N1 are all "1". In the iteration training process 3, the classification labels of the reference images R11-R13 and the input image N1 are all "2".

TABLE 1

| Iteration training process | Reference image | | | Input image |
| --- | --- | --- | --- | --- |
| | R11 | R12 | R13 | N1 |
| 1 | 0 | 0 | 0 | 0 |
| 2 | 1 | 1 | 1 | 1 |
| 3 | 2 | 2 | 2 | 2 |

Alternately, two iteration training processes may also be set as one cycle. In the first iteration training process of each cycle, the training images with the classification labels "0," "0," and "1" are sequentially selected from the image set belonging to the user A1 as the reference images R11-R13; in the next iteration training process, the training images with the classification labels "0," "0," and "2" are sequentially selected from the image set belonging to the user A1 as the reference images R11-R13. In addition, the classification labels of the input image N1 in three consecutive cycles are sequentially set as "0," "1," and "2". For instance, as shown in Table 2, each cycle includes two iteration training processes, and in each cycle the training process is performed on the input image N1 and the reference images R11-R13 with the same classification label.

TABLE 2

| | Iteration training process | Reference image | | | Input image |
| --- | --- | --- | --- | --- | --- |
| | | R11 | R12 | R13 | N1 |
| Cycle 1 | 1 | 0 | 0 | 1 | 0 |
| | 2 | 0 | 0 | 2 | 0 |
| Cycle 2 | 3 | 0 | 0 | 1 | 1 |
| | 4 | 0 | 0 | 2 | 1 |
| Cycle 3 | 5 | 0 | 0 | 1 | 2 |
| | 6 | 0 | 0 | 2 | 2 |

Certainly, the order of the classification labels of the obtained training images is merely exemplary and should not be construed as a limitation in the disclosure.

In the neural network 310, the difference between the reference image R11 and the input image N1 is compared, and a reference feature 311 is extracted from the reference image R11, and an input feature 312 is extracted from the input image N1. Next, the reference feature 311 and the input feature 312 are input to the fusion layer 313, and the fusion layer 313 performs a concatenation operation on the reference feature 311 and the input feature 312 to obtain a combined feature. After that, the combined feature is input to the fully connected layer 314 to obtain the predicted result 315. The steps performed in the neural networks 320 and 330 may be deduced therefrom. The predicted results 315, 325, and 332 of the three neural networks 310, 320, and 330 are input to the voting module 340. The voting module 340 applies the voting method to obtain a final predicted result 341. The voting module 340 may apply hard voting or soft voting. In an embodiment, the neural networks 310, 320, and 330 are implemented in form of ResNet-34, VGG-16, and Inception-V1, respectively, which is merely exemplary and should however not be construed as a limitation in the disclosure.

Figure 4:
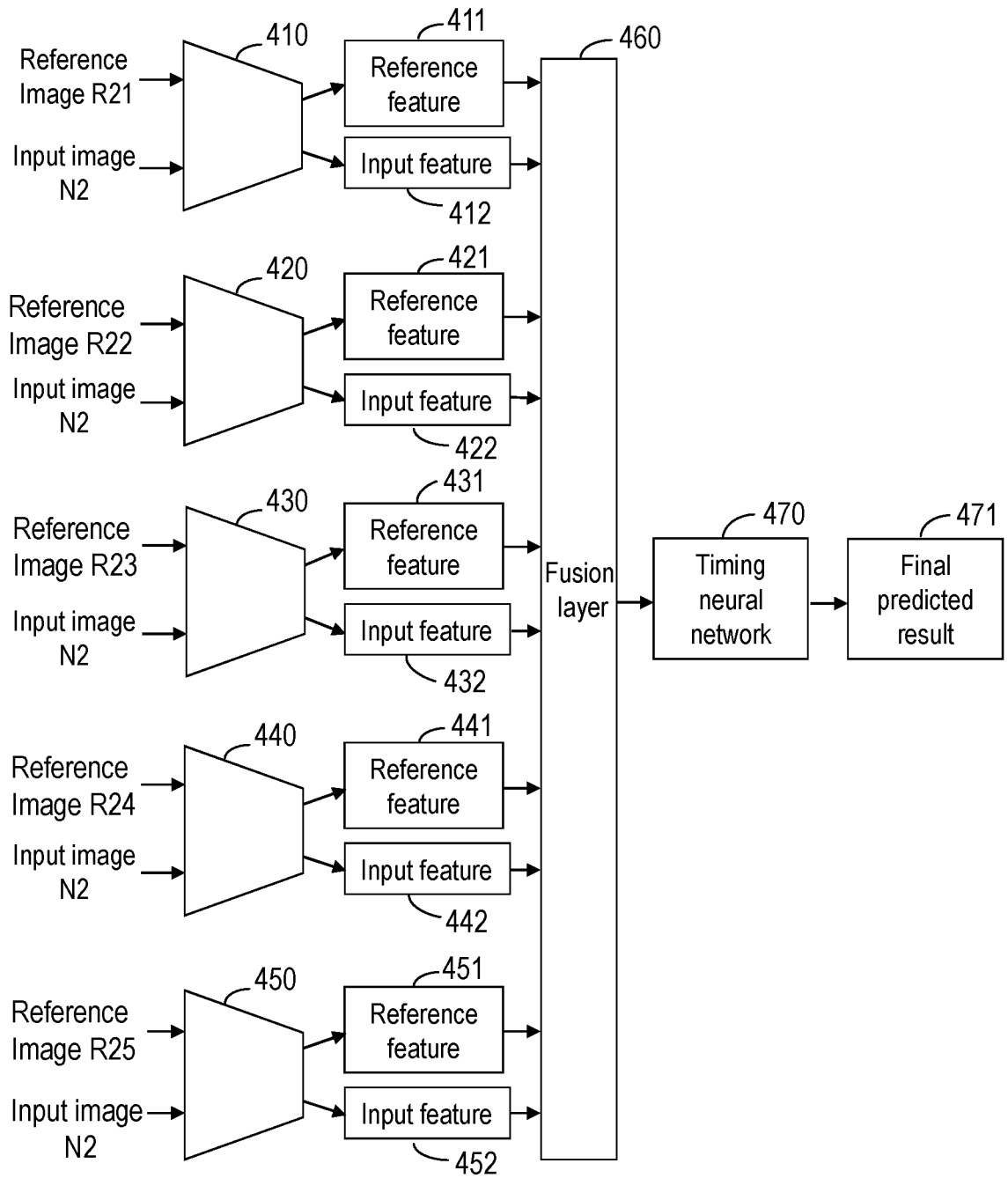
FIG. 4 is a schematic view of a second architecture of a recognition model according to an embodiment of the disclosure.

FIG. 4 is a schematic view of a second architecture of a recognition model according to an embodiment of the disclosure. In second first architecture as shown in FIG. 4, the second quantity is exemplified as five (neural networks 410-450); however, the quantity of the neural networks applied is not limited in this disclosure. Two, three, or more neural networks may be applied in other embodiments.

With reference to FIG. 4, the second architecture includes neural networks 410-450, a fusion layer 460, and a timing neural network 470. In each iteration training process, the processor 110 obtains five training images as reference images R21-R25 from a plurality of consecutive training images which have the same classification label and have not yet been obtained in the previous iteration training processes in the first image set, and the reference images R21-R25 together with the same input image N2 are individually input to the neural networks 410-450. The reference images R21-R25 and the input image N2 are the training images belonging to different users.

For instance, the processor 110 obtains N (e.g., 50) consecutive training images (marked as T1-T50) with a classification label (e.g., "0") from the first image set belonging to the user A1. In the first iteration training process, the training images T1-T5 are taken as the reference images R21-R25 of the neural networks 410-450; in the second iteration training process, the training images T6-T10 are taken as the reference images R21-R25 of the neural networks 410-450; in the third iteration training process, the training images T11-T15 are taken as the reference images R21-R25 of the neural networks 410-450, and the rest may be deduced therefrom. In each iteration training process, five consecutive training images are taken in sequence as the reference images R21-R25 of the neural networks 410-450, and the processes are continued to be performed until the training images T1-T50 are all taken. In addition, in each iteration training process, the processor 110 randomly selects any training image with the classification label "0" as the input image N2 from the second image set belonging to the user A2. The rest may be deduced therefrom, and then the training processes are continued to be performed for the training images with the classification label "1" and classification label "2", respectively.

In each iteration training process, the individual reference images R21-R25 and the individual input image N2 are compared by the neural networks 410-450, respectively, so as to extract reference features 411, 421, 431, 441, and 451 and input features 412, 422, 432, 442, and 452, respectively. As to the neural network 410, the difference between the reference image R21 and the input image N2 is compared, the reference feature 411 is extracted from the reference image R21, and the input feature 412 is extracted from the input image N2. The same principle is applied to the neural networks 420-450. Afterwards, the fusion layer 460 performs a concatenation operation on the reference features 411-451 and the input features 412-452 to obtain the combined feature. The fusion layer 460 then inputs the combined feature to the timing neural network 470 and obtains the final predicted result 471.

Here, the neural networks 410-450 are implemented in form of ResNet-34, Inception-V1, Inception-V1, VGG-16, and VGG-16, respectively, and the timing neural network 470 is implemented in form of a long short-term memory (LSTM) neural network, which are merely exemplary and should not be construed as limitations in the disclosure. Since the recognition model 123 of the second architecture as mentioned above applies consecutive training images for training, the recognition model 123 is adapted to recognize facial expressions shown on dynamic images.

FIG. 3 and FIG. 4 above both illustrate one reference image and one input image as the input to each of the neural networks; however, in other embodiments, FIG. 3 and FIG. 4 are applicable by taking two reference images and one input image as the input to each of the neural networks or taking three reference images and one input image as the input to each of the neural networks, which should not be construed as limitations in the disclosure.

After the recognition model 123 is trained, the processor 110 may recognize the image to be tested through the trained recognition model 123. During the recognition process, the input to the recognition model 123 may only be the image to be tested; alternatively, the input to the recognition model 123 may include the image to be tested and at least one reference image (reference image for testing) that has been labeled by the same one of the classification labels belonging to the same one of the users.

The above-mentioned embodiments may be collectively applied in actual intensive care units (ICU). The electronic apparatus 100 may be further applied together with an image capturing apparatus (such as a camera, a camcorder, or the like); that is, the image capturing apparatus is employed to capture images of a patient, the electronic apparatus 100 applies a face image capturing program (e.g., MediaPipe) or a multi-task cascaded convolutional neural network (MTCNN) to capture the images of face areas as the images to be tested; afterwards, the facial expressions of the patient are recognized through the recognition model 123.

In addition, most patients in the ICU usually wear masks on their faces; hence, before the recognition of the facial expressions, the processor 110 first performs a cropping process on the image to be tested, so as to crop a mask portion and keep a recognizable portion. In this application, during the training process, the processor 110 first performs a cropping process on the training samples in the training sample set 121 to crop the mask portion and keep the recognizable portion. The cropped training samples are then applied for subsequent training processes.

Figure 5:
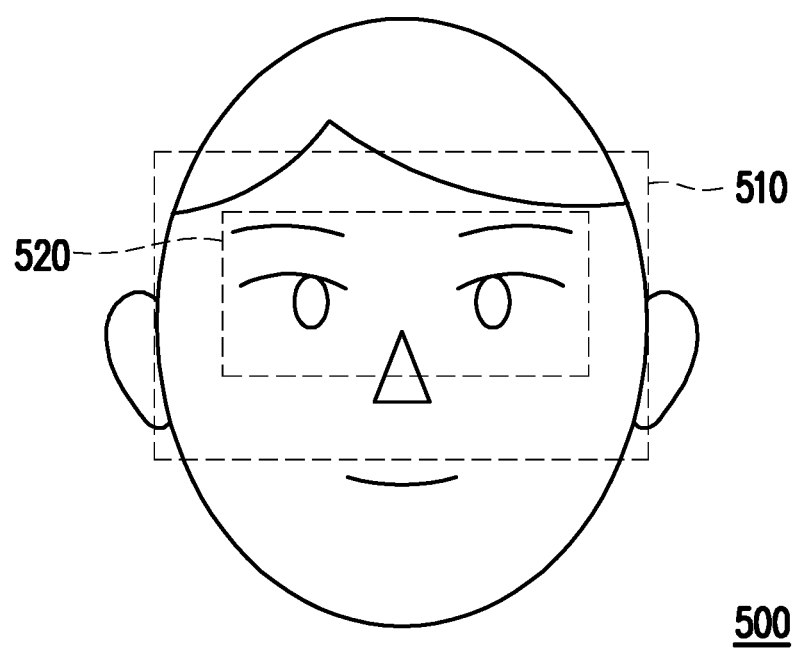
FIG. 5 is a schematic view of a facial image according to an embodiment of the disclosure.

FIG. 5 is a schematic view of a facial image according to an embodiment of the disclosure. The following description is provided with reference to FIG. 5. In an embodiment, the processor 110 applies the MTCNN to locate a face image 500 in an image. In view of the fact that an area near the eyebrows is the key area for interpreting the pain score, a first area 510 between the hairline and the nose is set as a recognizable portion, whereby attention may be drawn to the eyebrow area, and confusion resulting from the medical apparatus worn on the face may be prevented. In addition, on the basis of the center of the first area 510, 60% of the height of the first area 510 and 80% of the width of the first area 510 are taken to define a second area 520 as a recognizable portion, so as to further narrow the field of view and enable the recognition model 123 to focus on a specific area (the second area 520) of the human face.

According to an embodiment, in the training phase, the cropping process may be further performed on each training image in the training sample set 121, and a specific area of the human face (e.g., the second area 520 shown in FIG. 5) is taken as the training image. In the prediction stage, before recognition of the facial expressions, the processor 110 also performs the cropping process on the image to be tested, so as to recognize the specific area (i.e., the second area 520 shown in FIG. 5).

Figure 6:
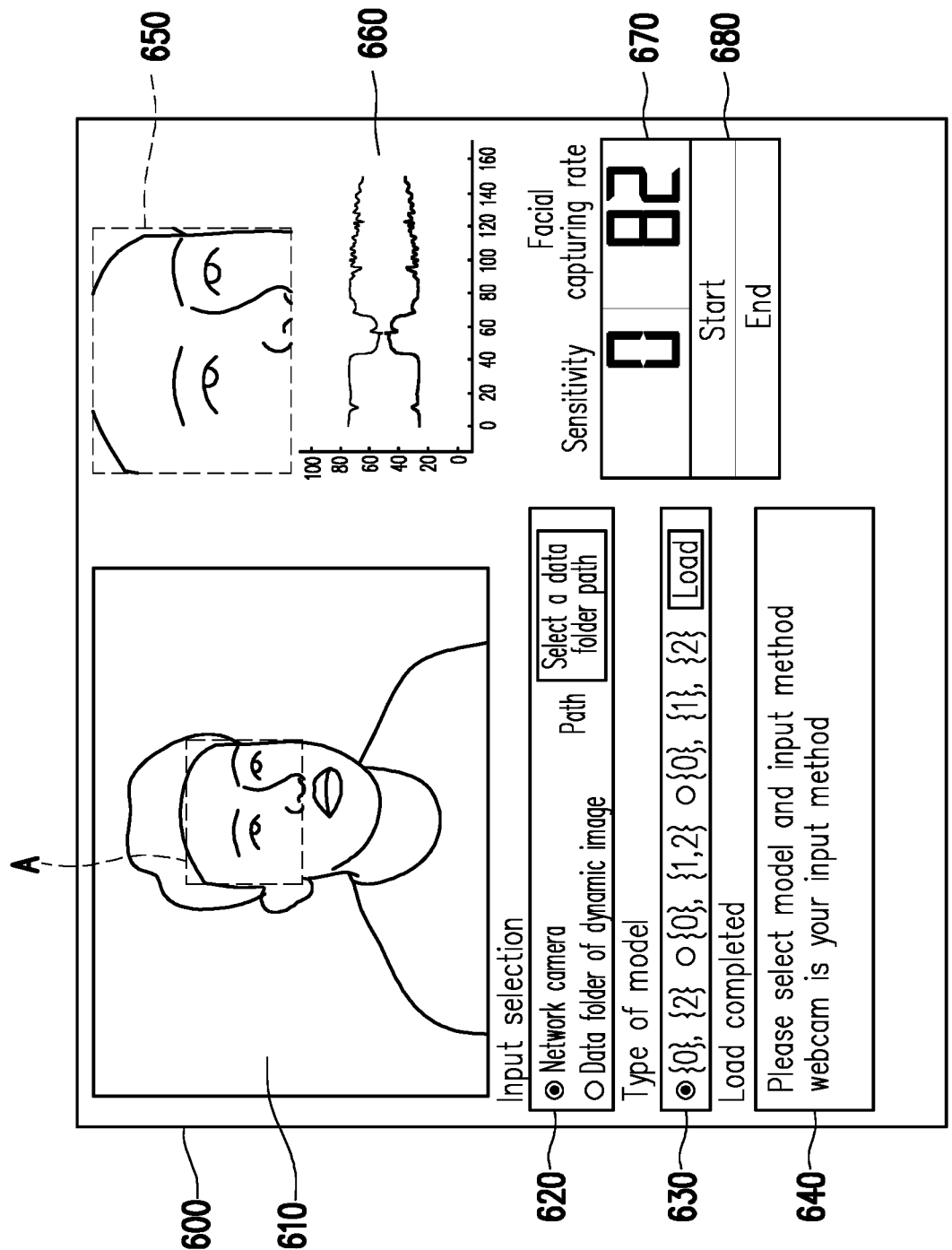
FIG. 6 is a schematic view of a user interface according to an embodiment of the disclosure.

FIG. 6 is a schematic view of a user interface according to an embodiment of the disclosure. With reference to FIG. 6, the electronic apparatus 100 may further provide a user interface 600 in the display. The display may be built in the electronic apparatus 100 or coupled to the electronic apparatus 100 through a cable or in a wireless manner. The user interface 600 includes a plurality of blocks 610-670. The block 610 is configured to display the input image, and a specific block A (corresponding to the first area 510 in FIG. 5) may be further framed. The selection of the source of the input image is performed in the block 620. Specifically, a network camera may be selected to capture the input image, the input image may be selected from a data folder of the dynamic image, or a data folder path may be directly selected. The block 630 is configured to select the type of the recognition model 123. For instance, "{0}, {2}" represents the input to each neural network of the recognition model 123 includes two reference images with the classification labels "0" and "2". "{0}, {1, 2}" represents that the input of each neural network of the recognition model 123 includes two reference images, one of which is labeled by the classification label "0", and the other is labeled by the classification label "1" or "2". "{0}, {1}, {2}" represents the input to each neural network of the recognition model 123 includes three reference images with the classification labels "0," "1," and "2".

The block 640 is configured to display an event log. The block 650 is configured to display the framed specific block A in the block 610. The block 660 is configured to display the final predicted result of the dynamic image. The horizontal axis of a curve graph shown in the block 660 denotes the time sequence (a time axis of the dynamic image), and the vertical axis represents the classification probability. For instance, the upper curve of the two curves in FIG. 6 corresponds to the possibility that the classification label is "0", and the lower curve corresponds to the possibility that the classification label is "2". That is, the image frame (as the input image) at a time T may be predicted by the recognition model 123 to obtain a probability value of "0" and a probability value of "2". In the present embodiment, it can be seen that the final predicted result of the input dynamic image approaches "0"; that is, most of the time the result of being calm is predicted, but during a certain period of time (e.g., time 40-70) the result of being painful is predicted.

The block 670 displays sensitivity and a face capturing rate. The sensitivity represents the accuracy of the recognition model 123. For instance, when a video is selected from the block 620 for testing, the accuracy rate of the recognition model 123 is displayed in the column corresponding to the sensitivity. The face capturing rate is expressed as a percentage and represents the number of image frames out of a plurality of frames included in the dynamic image in which the human face is detected. The accuracy rate "82" indicates the human face is detected in a total of 82 image frames out of 100 frames. The block 680 provides start and end buttons.

Table 3 shows the predicted results of the recognition models trained by applying different architectures. As shown in Table 3, the final predicted result of the actual experiment is obtained by applying the architecture of the voting module (similar to the first architecture shown in FIG. 3) and the architecture of bidirectional LSTM (Bi-LSTM) (similar to the second architecture shown in FIG. 4).

TABLE 3

| Types of the reference image used for training | Use of the reference image during test | | |
|---|---|---|---|
| | Not use | Use classification label "0" | Use all classification labels |
| Two types {0}, {2} | Use the voting module Accuracy 0.8771 | Use the voting module Accuracy 0.8937 | Use Bi-LSTM Accuracy 0.9221 |
| Two types {0}, {1, 2} | Use the voting module Accuracy 0.7954 | Use the voting module Accuracy 0.8 | Use Bi-LSTM Accuracy 0.8323 |
| Three types {0}, {1}. {2} | Use the voting module Accuracy 0.6421 | Adopt the voting module Accuracy 0.6347 | Use the voting module, the accuracy rate is 0.6493 |

When the electronic apparatus 100 is applied to a medical system, the medical staff may perform the training of the recognition model 123 through the user interface 600 provided by the electronic apparatus 100 and use the trained recognition model after the training is completed.

For instance, the medical staff may select the source of the input image (the patient's image) in the block 620 and display the input image in the block 610. Next, the medical staff may select the type of the recognition model 123 in the block 630. After the selection in the blocks 620 and 630 is completed, the block 640 displays the selected results (the event log). Afterwards, the medical staff may press the start button in the block 680 to apply the recognition model 123 to recognize the input image and display the final predicted result in the blocks 660 and 670.

To sum up, according to one or more embodiments of the disclosure, during the training, the reference images for training and the input image for training from different users are taken as the inputs to the neural networks, so as to perform the training. Features may be extracted based on differences between the images, and therefore the accuracy of the recognition model may be improved. Besides, according to one or more embodiments of the disclosure, the image to be tested is cropped, so that the facial expressions of the person to be tested may be recognized by comparing the peripheries of the eyes with the reference images even in the absence of the overall facial information.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. An electronic apparatus configured for image recognition and comprising:
   a storage apparatus, storing a training sample set, the training sample set comprising a plurality of image sets respectively belonging to a plurality of users, each of the image sets comprising a plurality of training images, each of the training images being labeled by one of a plurality of classification labels, each of the training images included in each of the image sets having a face area of one of the users corresponding to each of the image sets; and
   a processor, coupled to the storage apparatus and configured to train a recognition model to recognize which one of the classification labels to which an image to be tested belongs through the trained recognition model, wherein the recognition model comprises a plurality of neural networks,
   the processor is configured to train the recognition model, and steps of training the recognition model comprises:
   obtaining the training images respectively corresponding to the classification labels from a first image set as a plurality of reference images for training, wherein the first image set belonging to a first user is one of the image sets, each of the training images included in the first image set has a face area of the first user;
   obtaining one of the training images from a second image set belonging to a second user as an input image for training, wherein the second image set is another of the image sets different from the first image set, the first user is different from the second user, each of the training images included in the second image set has a face area of the second user; and
   taking the reference images for training belonging to the first user and the input image for training belonging to the second user as inputs to the neural networks, wherein the input to each of the neural networks comprises at least one of the reference images for training and the input image for training,
   wherein in each of a plurality of iteration training processes, the processor is configured to use both of at least one of the reference images for training from the first image set and the input image for training from the second image set as inputs to each of the neural networks,
   the recognition model adopts one of a first architecture or a second architecture,
   the first architecture further comprises a plurality of first fusion layers, a plurality of fully connected layers and a voting module, each of the neural networks corresponds to one of the first fusion layers and one of the fully connected layers, an output of each of the neural networks is used as an input of a corresponding first fusion layer, an output of the corresponding first fusion layer is used as an input of a corresponding fully connected layer, outputs of the fully connected layers are used as inputs of the voting module, and a first final predicted result is obtained through the voting module from the outputs of the fully connected layers,
   the second architecture further comprises a second fusion layer and a timing neural network, outputs of the neural networks are used as inputs of the second fusion layer, and an output of the second fusion layer is used as input of the timing neural network, and a second final prediction result is obtained through the timing neural network based on the output of the second fusion layer.

2. The electronic apparatus according to claim 1, wherein the processor is configured to:
   perform a cropping process on each of the training images to crop a mask portion and keep a recognizable portion.
3. The electronic apparatus according to claim 1, wherein in response to the recognition model adopting the first architecture, the processor is configured to:
   extract a reference feature and an input feature from one of the reference images for training and the input image for training in the input to each of the neural networks, respectively;
   combine the reference feature and the input feature to obtain a combined feature through one of the first fusion layers corresponding to each of the neural networks;
   obtain a predicted result from the combined feature through one of the fully connected layers corresponding to each of the neural networks; and
   obtain the final predicted result from all of the predicted results of the neural networks by applying a voting method through the voting module.
4. The electronic apparatus according to claim 3, wherein the recognition model comprises a first quantity of the neural networks, and in each of the iteration training processes, the processor is configured to:
   obtain the first quantity of the training images from the first image set as the reference images for training and individually input the reference images for training together with the same input image for training to the neural networks.
5. The electronic apparatus according to claim 1, wherein in response to the recognition model adopting the second architecture, the processor is configured to:
   extract a reference feature and an input feature from one of the reference images for training and the input image for training in the input to each of the neural networks, respectively;
   combine all of the reference features and all of the input features obtained from the neural networks through the second fusion layer to obtain a combined feature; and
   obtain a final predicted result from the combined feature through the timing neural network.
6. The electronic apparatus according to claim 5, wherein the recognition model comprises a second quantity of the neural networks, and in each of the iteration training processes, the processor is configured to:
   obtain the second quantity of the training images as the reference images for training from a plurality of consecutive training images which are all labeled by one of the classification labels and are not yet obtained in the previous iteration training processes in the first image set and individually input the reference images for training together with the same input image for training to the neural networks.
7. The electronic apparatus according to claim 1, wherein in a process of recognizing the image to be tested through the trained recognition model, the inputs to the recognition model comprise the image to be tested or comprise the image to be tested and at least one reference image for testing, wherein the at least one reference image for testing and the image to be tested are labeled by the same one of the classification labels belonging to the same one of the users.
8. An image recognition method carried out by a processor and comprising:
   training a recognition model to recognize which one of a plurality of classification labels to which an image to be tested belongs through the trained recognition model, wherein the recognition model comprises a plurality of neural networks, and
   steps of training the recognition model comprise:
   providing a training sample set, the training sample set comprising a plurality of image sets respectively belonging to a plurality of users, each of the image sets comprising a plurality of training images, each of the training images being labeled by one of a plurality of classification labels, each of the training images included in each of the image sets having a face area of one of the users corresponding to each of the image sets;
   obtaining the training images respectively corresponding to the classification labels from a first image set as a plurality of reference images for training, wherein the first image set belonging to a first user is one of the image sets, each of the training images included in the first image set has a face area of the first user;
   obtaining one of the training images from a second image set belonging to a second user as an input image for training, wherein the second image set is another of the image sets different from the first image set, the first user is different from the second user, each of the training images included in the second image set has a face area of the second user; and
   taking the reference images for training belonging to the first user and the input image for training belonging to the second user as inputs to the neural networks, so as to perform the training, wherein the input to each of the neural networks comprises at least one of the reference images for training and the input image for training,
   wherein in each of a plurality of iteration training processes, both of at least one of the reference images for training from the first image set and the input image for training from the second image set are used as inputs to each of the neural networks,
   the recognition model adopts one of a first architecture or a second architecture,
   the first architecture further comprises a plurality of first fusion layers, a plurality of fully connected layers and a voting module, each of the neural networks corresponds to one of the first fusion layers and one of the fully connected layers, an output of each of the neural networks is used as an input of a corresponding first fusion layer, an output of the corresponding first fusion layer is used as an input of a corresponding fully connected layer, outputs of the fully connected layers are used as inputs of the voting module, and a first final predicted result is obtained through the voting module from the outputs of the fully connected layers,
   the second architecture further comprises a second fusion layer and a timing neural network, outputs of the neural networks are used as inputs of the second fusion layer, and an output of the second fusion layer is used as input of the timing neural network, and a second final prediction result is obtained through the timing neural network based on the output of the second fusion layer.
9. The image recognition method according to claim 8, wherein the step of training the recognition model further comprises:
   performing a cropping process on each of the training images to crop a mask portion and keep a recognizable portion.
10. The image recognition method according to claim 8, wherein in response to the recognition model adopting the first architecture, the step of training by taking the reference images for training belonging to the first user and the input image for training belonging to the second user as the inputs to the neural networks comprises:

extracting a reference feature and an input feature from one of the reference images for training and the input image for training in the input to each of the neural networks, respectively;

combining the reference feature and the input feature to obtain a combined feature through one of the first fusion layers corresponding to each of the neural networks;

obtaining a predicted result from the combined feature through one of the fully connected layers corresponding to each of the neural networks; and obtaining the final predicted result from all of the predicted results of the neural networks by applying a voting method through the voting module.

11. The image recognition method according to claim 10, wherein the recognition model comprises a first quantity of the neural networks, and each of the iteration training processes, the image recognition method further comprises:

obtaining the first quantity of the training images from the first image set as the reference images for training and individually inputting the reference images for training together with the same input image for training to the neural networks.

12. The image recognition method according to claim 8, wherein in response to the recognition model adopting the second architecture, the step of taking the reference images for training belonging to the first user and the input image for training belonging to the second user as the inputs to the neural networks comprises:

extracting a reference feature and an input feature from one of the reference images for training and the input image for training in the input to each of the neural networks, respectively;

combining all of the reference features and all of the input features obtained from the neural networks through the second fusion layer to obtain a combined feature; and obtaining a final predicted result from the combined feature through the timing neural network.

13. The image recognition method according to claim 12, wherein the recognition model comprises a second quantity of the neural networks, and in each of the iteration training processes, the image recognition method further comprises:

obtaining the second quantity of the training images as the reference images for training from a plurality of consecutive training images which are all labeled by one of the classification labels and are not yet obtained in the previous iteration training processes in the first image set, and individually inputting the reference images for training together with the same input image for training to the neural networks.

14. The image recognition method according to claim 8, wherein in a process of recognizing the image to be tested through the trained recognition model, the image recognition method comprises:

inputting the image to be tested to the recognition model; or inputting the image to be tested and at least one reference image for testing to the recognition model, wherein the image to be tested and the at least one test reference image are labeled by the same one of the classification labels belonging to the same one of the users.

\* \* \* \* \*